United States Patent [19]
Kalarney

[11] Patent Number: 6,106,970
[45] Date of Patent: Aug. 22, 2000

[54] PORTABLE RENEWABLE ENERGY SYSTEM ENCLOSURE

[75] Inventor: Kerry T. Kalarney, Placerville, Colo.

[73] Assignee: The Powerpod Corporation, Telluride, Colo.

[21] Appl. No.: 09/109,693

[22] Filed: Jul. 2, 1998

Related U.S. Application Data

[60] Provisional application No. 60/051,641, Jul. 3, 1997.

[51] Int. Cl.[7] .................................................. H01M 2/10
[52] U.S. Cl. .............................. 429/96; 429/99; 429/100; 429/123
[58] Field of Search .................................. 429/96, 98, 99, 429/100, 123; D13/103, 102, 107–109

[56] References Cited

U.S. PATENT DOCUMENTS

| | | |
|---|---|---|
| 1,075,556 | 10/1913 | Fenoughty . |
| 4,983,473 | 1/1991 | Smith ......................................... 429/48 |
| 5,558,949 | 9/1996 | Iwatsuki et al. ........................... 429/99 |

*Primary Examiner*—Maria Nuzzolillo
*Assistant Examiner*—Jonathan Crepeau
*Attorney, Agent, or Firm*—Christie, Parker & Hale, LLP

[57] ABSTRACT

A portable enclosure for housing a renewable energy system and for use with an energy-generating system is provided. The enclosure comprises a container having side walls, a bottom wall, an open top, and a dividing wall that divides the inside of the container into first and second compartments, both of which are accessible from the open top. The first compartment is capable of housing at least one 12v battery. The second compartment is capable of housing at least one electrical component other than a battery. The dividing wall has an aperature capable of permitting a wire or other electrical connector to extend therethrough to connect the battery to the electrical component. The enclosure further comprises a lid capable of fitting over and enclosing the open top of the container to provide a water-tight seal therewith. An electrical connection is provided for electrically-connecting electrical components within the container to a renewable energy generator outside the container.

24 Claims, 6 Drawing Sheets

PORTABLE RENEWABLE ENERGY SYSTEM ENCLOSURE

CROSS-REFERENCE TO RELATED APPLICATIONS

This application claims priority of U.S. Provisional Application No. 60/051,641, filed Jul. 3, 1997, the disclosure of which is incorporated herein by reference.

FIELD OF INVENTION

The present invention relates to portable renewable energy systems and their enclosures.

BACKGROUND OF THE INVENTION

A renewable energy system is a complete energy-generating and storage system that utilizes non-fossil fuel based energy sources. Phenomena which have been exploited to generate subsequently stored energy are, for example, wind, solar radiation, hydrogen, moving water, etc. These naturally occurring phenomena are commonly defined as renewable energy sources. A renewable energy system typically has all the necessary components to convert the energy source into a useful form such as electricity. Likewise, a typical renewable energy system has the ability to store the energy and allow for its use through a distribution point. The present invention utilizes batteries to store the energy generated from the attached renewable energy source and has conductive contact points from which the stored energy can be distributed.

Because the present invention utilizes electrical components, it is subject to the National Electric Code (NEC). For safety reasons, the NEC requires that the batteries be housed in a separate, sealed and ventilated compartment, in a manner preventing unintended interaction between the batteries and any other electrical components. The present invention satisfies all the safety requirements defined by the National Electric Code and other applicable safety codes. The present invention also offers the benefit of being portable, compared to the typical renewable energy system used today which is often stationary in design.

SUMMARY OF THE INVENTION

The present invention provides an enclosure for a power system that utilizes renewable energy technology. Preferably, the enclosure is a durable canister or vessel, cylindrical in shape with a domed top. In one embodiment of the invention, the enclosure can house a renewable energy system capable of providing up to 6 kW of instantaneous power. To date, there are no other enclosures that include all the features described below, and no renewable energy system enclosures have the cylindrical domed shape of the present invention.

The power system housed in the enclosure is specifically designed for powering small loads in remote field locations away from traditional power sources. The power system is simple to deploy and simple to interface with any device in need of a power supply. It is ideal for small lighting loads, entertainment systems, medical and domestic refrigeration systems, and other applications where electrical power is needed or desired.

In one embodiment, the present invention provides a weatherproof enclosure that complies with the NEC, a vented battery compartment, a separate and also vented electrical component compartment, and a way to mount the renewable energy source directly to the enclosure for additional compactness.

The enclosure is waterproof—or at least rainproof—and provides two sealed, isolated and ventilated compartments. One sealed compartment contains the batteries. The other contains electrical components that convert the energy generated by the attached renewable energy source into electricity, which is subsequently stored in the batteries in the other sealed compartment.

The battery compartment provides sufficient space to hold several batteries. The batteries are of sufficient size and configuration to enable them to be placed in removable trays that stack on top of each other. Up to six large, 6v or 12v batteries can be placed in each tray, and up to three trays of batteries can be placed inside the sealed enclosure. In this way, the batteries are easily installed and easily removed.

The other compartment provides up to 18 square feet of surface area, depending upon the size of the enclosure, which is sufficient to hold a variety of configurations of renewable energy system components, i.e., electrical components, necessary to convert energy from the associated energy source into electricity and provide any desired processing (e.g.,voltage or current regulation, switching, etc.). The compartment containing the electrical components can be a fixed (permanent) configuration or flexibly interchangeable in response to the possibility that a specific renewable energy source may require different electrical components to convert energy into electricity most efficiently.

The compact design of the present invention facilitates for efficient, user-friendly mounting of energy generation components such as photoelectric panels or solar collectors, wind turbines, fuel cells, etc., and efficient, user-friendly placement of the internal batteries and electrical components in close proximity to the energy generation components in order to minimize electrical line losses. The enclosure of the present invention allows for a renewable energy system that meets all of the criteria required by the NEC and recommended by industry. The enclosure can be made from any type of material capable of maintaining a waterproof or rainproof enclosure.

BRIEF DESCRIPTION OF THE DRAWINGS

The above-mentioned features and other features of presently preferred and other forms of the invention are set forth in the detailed description presented with reference to the accompanying drawings in which.

DETAILED DESCRIPTION OF THE INVENTION

Figure 1:
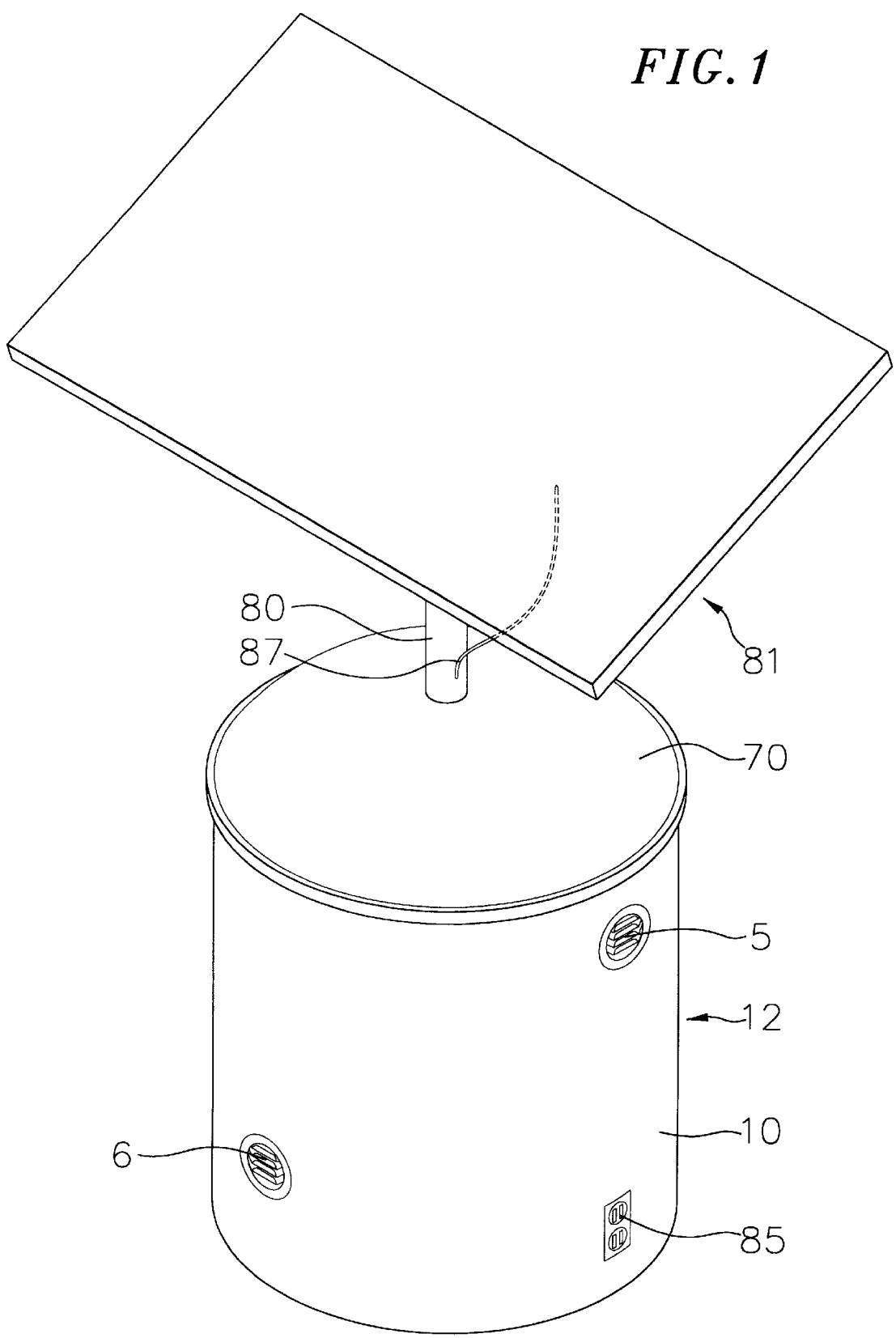
FIG. 1 is a perspective view of a portable renewable energy system enclosure with an energy-generating component (single panel solar collector) attached.
Figure 2:
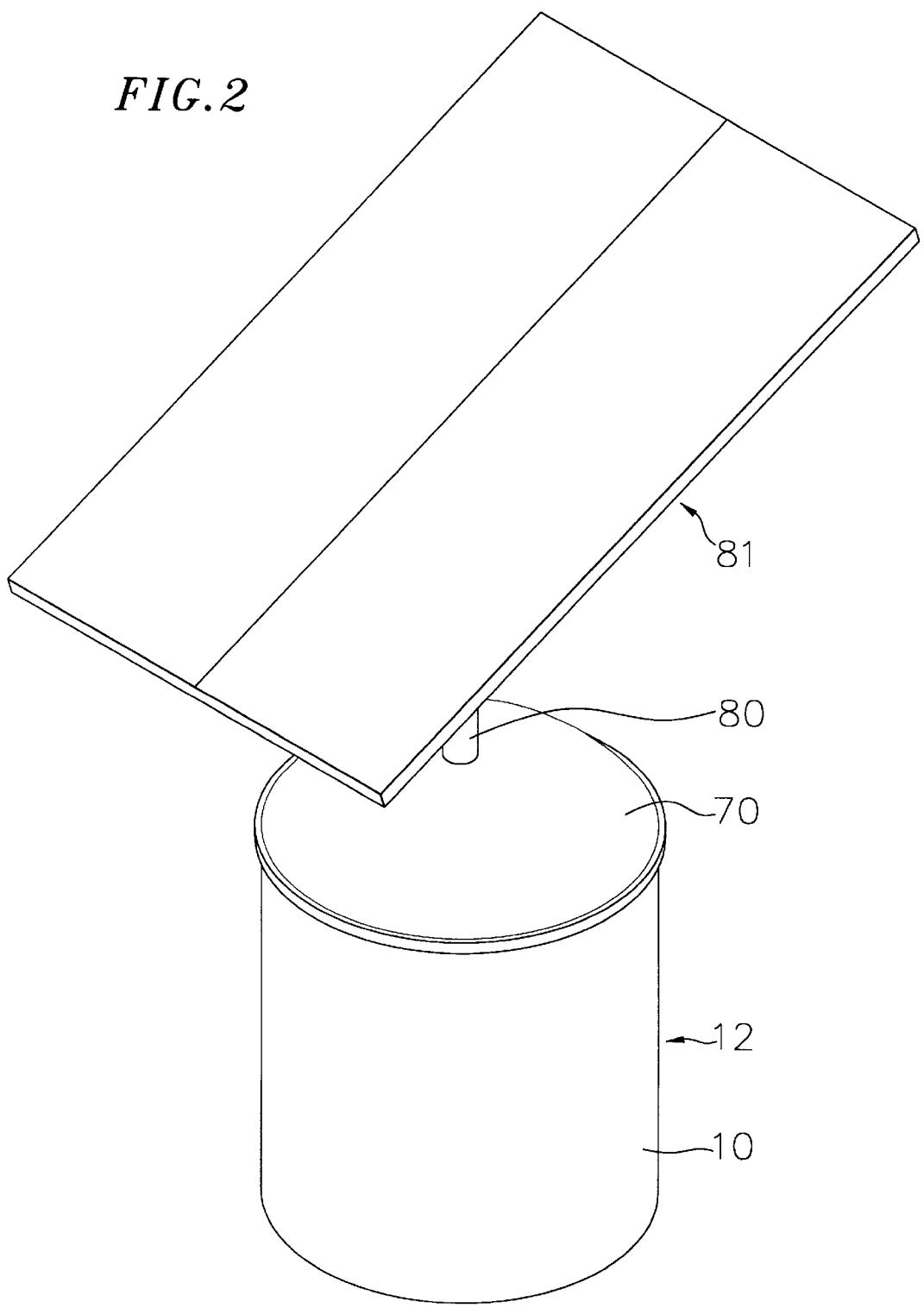
FIG. 2 is a perspective view of a portable renewable energy system enclosure with a second variation of an energy-generating component (double panel solar collector) attached.
Figure 3:
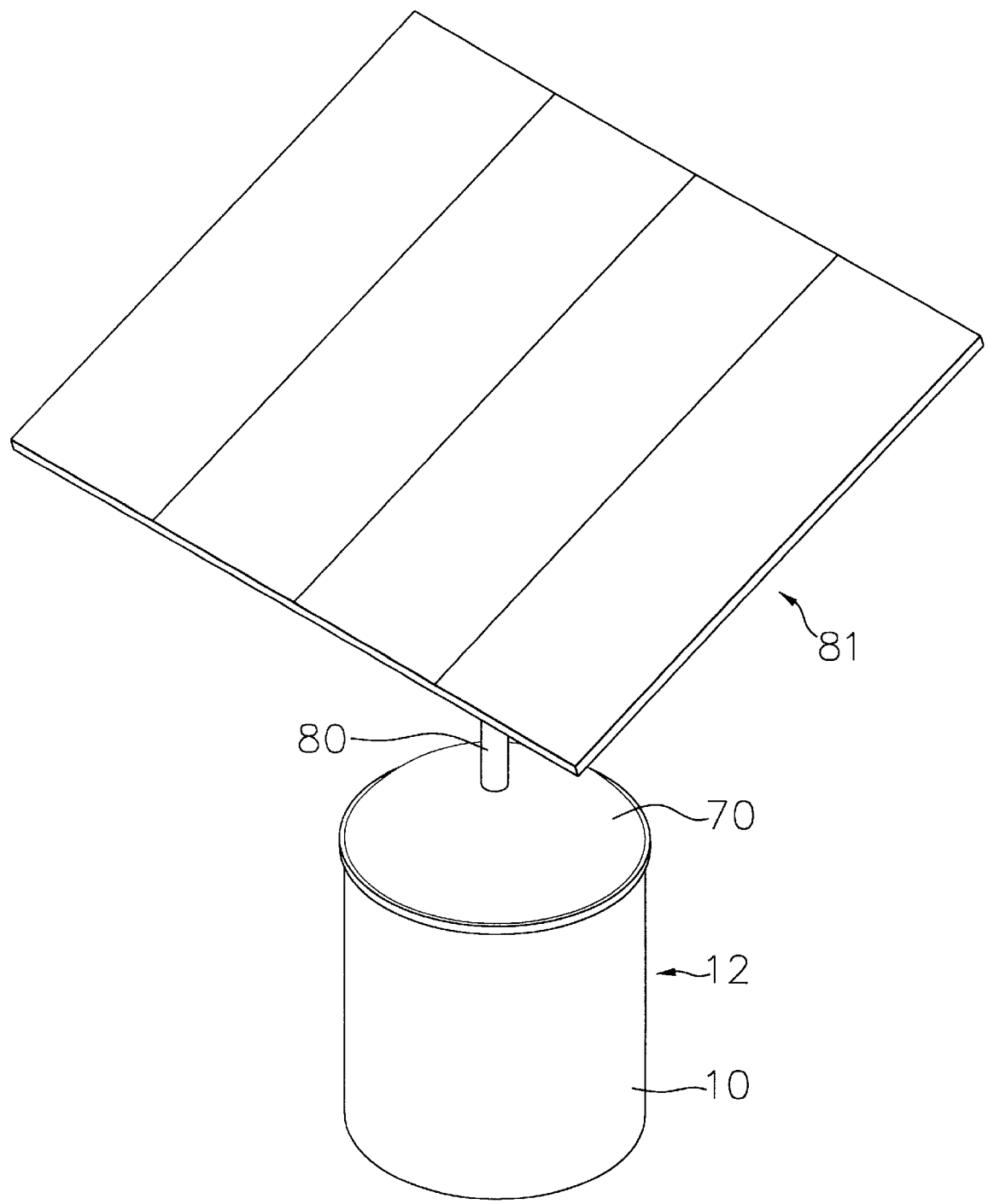
FIG. 3 is a perspective view of a portable renewable energy system enclosure with a third variation of an energy-generating component (four-panel solar collector) attached.

The present invention provides an enclosure for a renewable energy system. In one embodiment, the enclosure 12 comprises a cylindrical container 10, i.e., a durable canister or vessel, covered with a removable, dome-shaped cover 70. As shown in FIGS. 1, 2 and 3, the enclosure 12 is connected to an energy-generating component 81.

Figure 4:
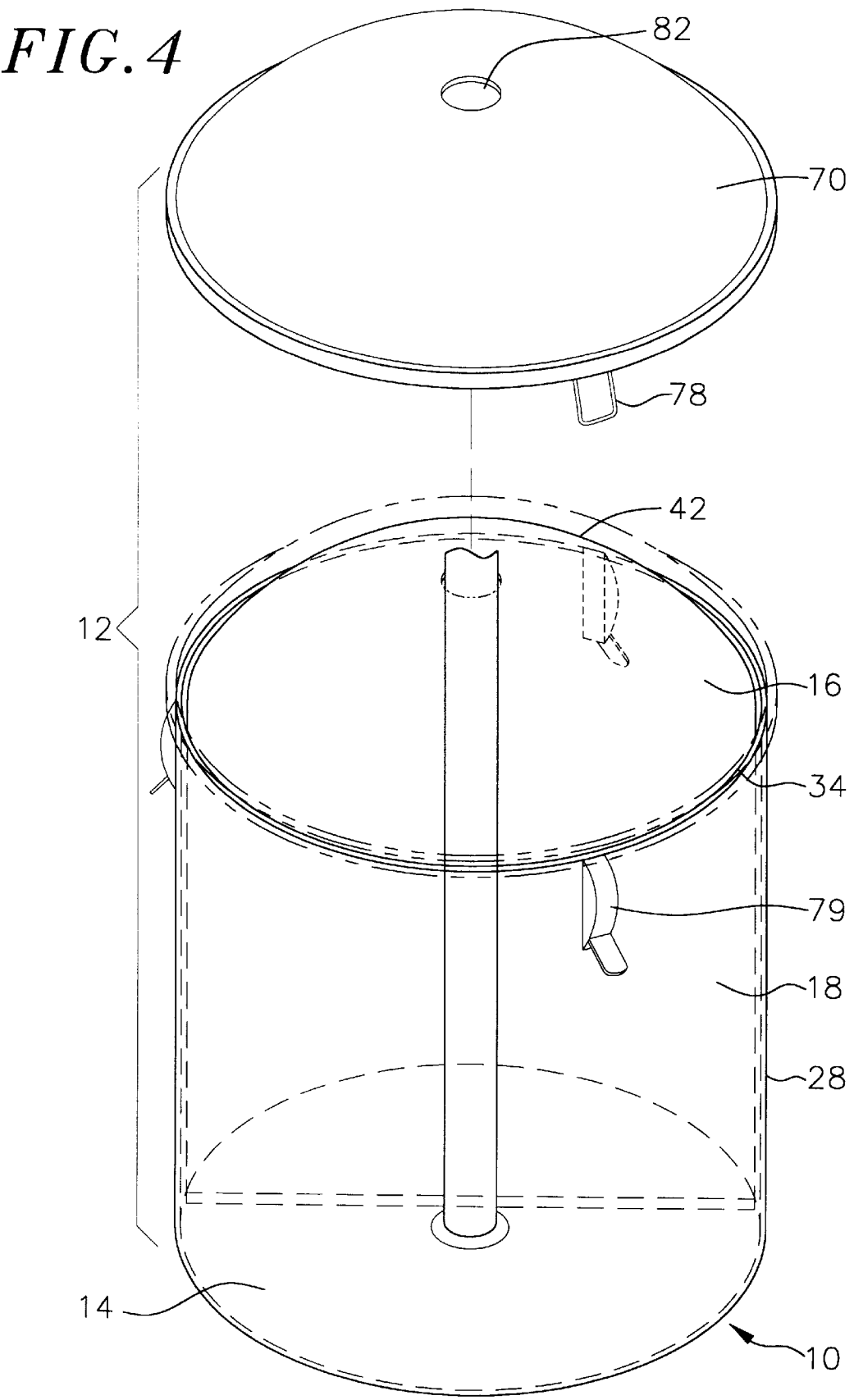
FIG. 4 is an exploded schematic view of a portable renewable energy system enclosure.
Figure 5:
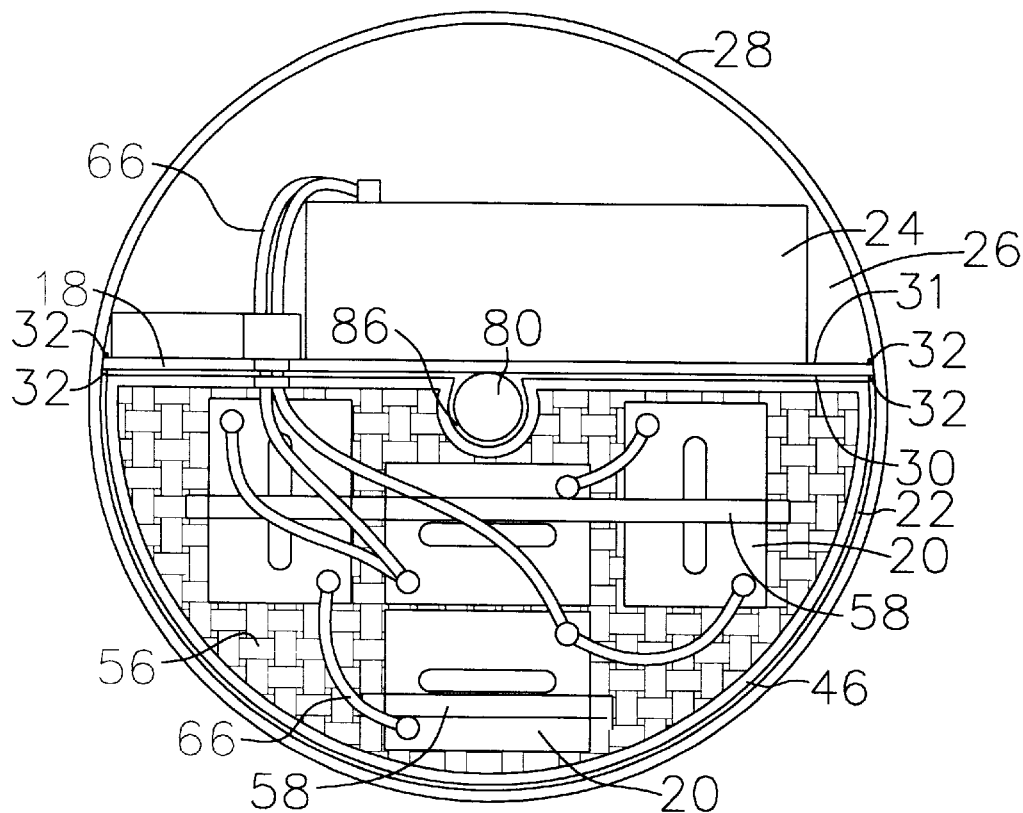
FIG. 5 is a schematic top view of the present invention, showing the two separate compartments and the support pole for the attachable energy-generating component.
Figure 7:
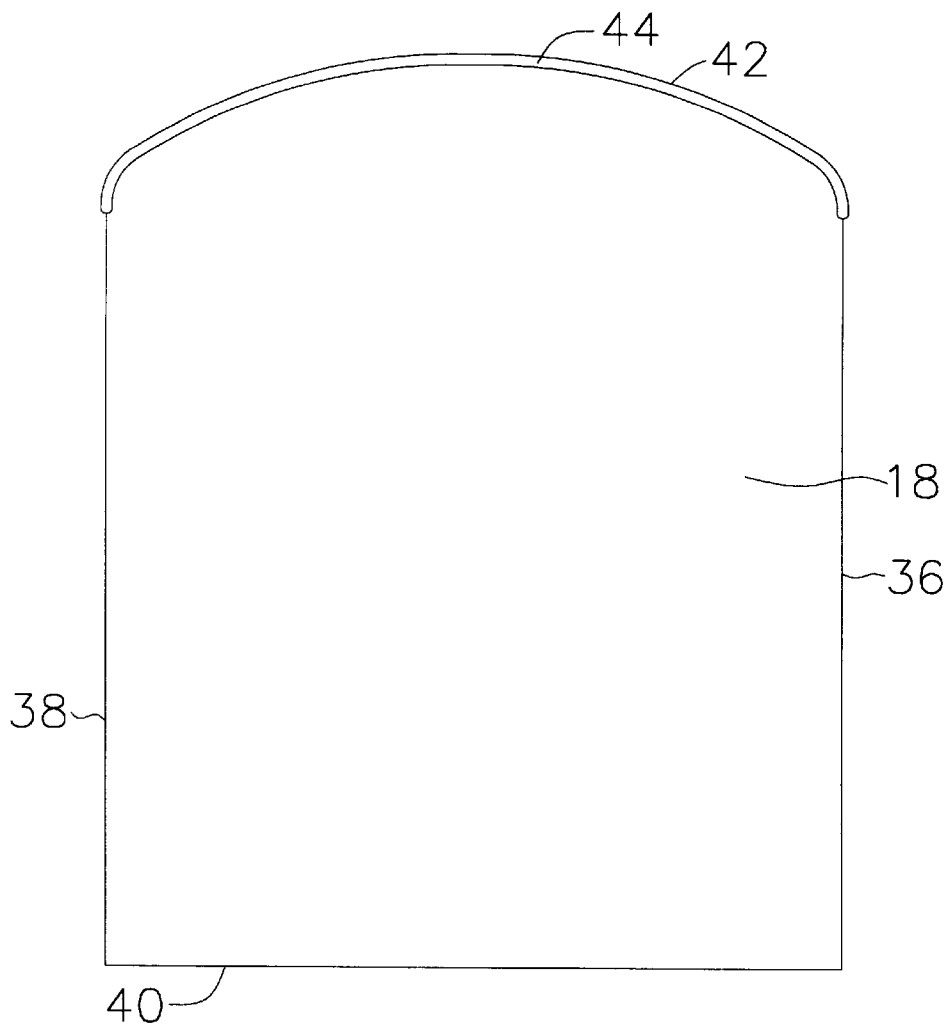
FIG. 7 is a side view a dividing wall.

Referring to FIGS. 4, 5 and 7, the enclosure 12 comprises a cylindrical container 10 having a bottom closed end 14, a top open end 16, a cylindrical vertical wall 28, and a top edge 34. The cylindrical container 10 has an interior off-centered wall 18 (i.e., dividing wall), shown in phantom in FIG. 4, that divides the container into two vertically separated compartments 22 and 26. Batteries 20 are housed in the first compartment 22, and electrical components 24 other than batteries are housed in the second compartment 26. The non-battery electrical components are, in some embodiments, unique to the particular renewable energy system being used.

The off-centered wall 18 is defined by a first side edge 36, a second side edge 38, a bottom edge 40, a curved top edge 42, a first face 30 and a second face 31. When installed, the off-centered wall 18 is held in place by two pairs of ribs (or flanges) 32 protruding from the inside of the vertical wall 28 of the container 10. Each pair of ribs 32 is mounted on opposite sides of the inside of the container 10. Between each pair of ribs 32 is a space sufficient to fit the off-centered wall 18. The ribs 32 extend from at or near the top edge 34 of the container 10 to at or near the bottom closed end 14. Alternatively, other suitable means for keeping the off-centered wall 18 in place can be used. For example, numerous pairs of short ribs could be placed along the height of the vertical wall and/or along the bottom of the container.

The contour of the top curved edge 42 of the off-centered wall 18 is substantially similar to the shape of the inner surface of the domed-shaped cover 70. Preferably, an elastomeric seal member 44 is permanently attached to the top curved edge 42 such that when the off-centered wall 18 is properly installed and the dome-shaped cover 70 is properly placed on the cylindrical container 10, a seal is formed separating the first compartment 22 from the second compartment 26.

Figure 6:
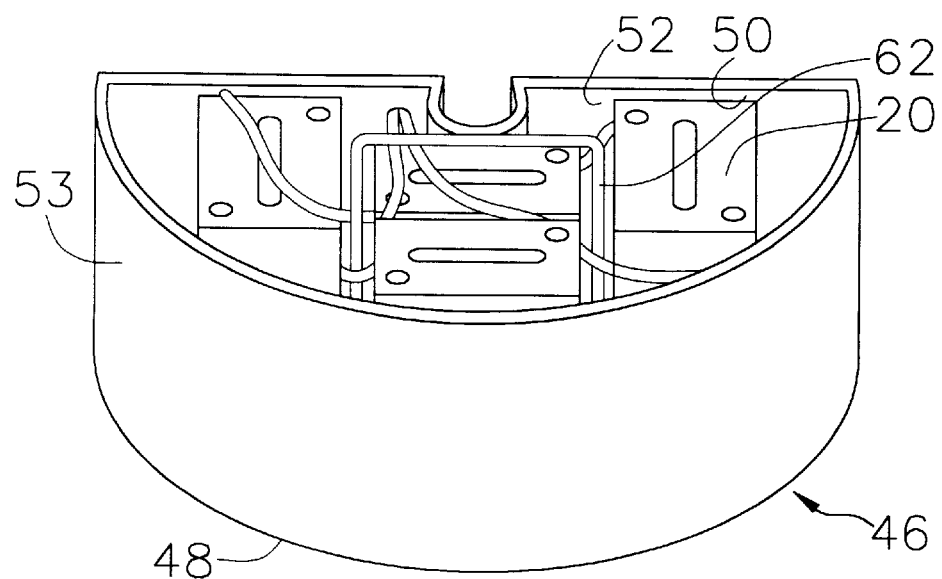
FIG. 6 is a perspective view of a battery tray.

The first compartment 22, designed to house the batteries 20, is defined by the inside of the vertical wall 28 of the cylindrical container 10 and by the first face 30 of the off-centered wall 18. The first compartment 22 is designed to accept up to three individual trays 46, each capable of holding up to four large 12 v batteries 20. As shown in FIG. 6, each shelf 46 is essentially semicircular in shape. Each shelf has a closed end 48 on the bottom, an open end 50 on the top, a straight vertical wall 52, a rounded vertical wall 53 and, preferably, a height greater than the height of the batteries stored inside. When batteries 20 are placed in each tray 46 and secured in their proper position, the top of each battery remains below the top edges of the tray walls 52 and 53.

In a preferred embodiment, a plurality of holes (not shown) are drilled in the bottom closed end 48 of each tray 46 to facilitate airflow and venting, e.g., for cooling purposes. Alternatively, a wire mesh spacer 56, as shown in FIG. 5, fits into the bottom of each tray 46. The shape of the wire mesh is essentially defined by the walls 52 and 53 of the trays 46, and therefore has a generally semicircular shape. The wire mesh 56 is sufficiently porous and thick to define an air space located beneath the batteries 20 when they are placed directly on top of the wire mesh spacer. This design allows air to circulate around all sides of each battery 20 when occupying its proper position within each tray 46.

Preferably, four batteries are placed in each tray 46. The batteries 20 are held in place by fasteners directly attached to either the interior of the trays 46 or the wire mesh spacer 56. The fasteners prevent the batteries 20 from moving around and reduce the likelihood of damage while in transit. In the depicted embodiment, the fasteners are in the form of straps 58 that are attached at both ends to the tray 46 and extend over one or more batteries 20. Other types of fasteners can be used instead, or in conjunction with, the straps.

Preferably, a tray handle 62 is attached to or integrated with the interior of each tray 46, with a height essentially equivalent to the height of the walls 52 and 53 of the corresponding tray 46. The handle 62 allows the user to easily remove and insert the tray and provides added support for the upper trays. Each individually contained battery tray 46 can then easily be stacked, one on top of the other, in the first compartment 22 of the cylindrical container 10.

The second compartment 26 is defined by the inside of the vertical wall 28 of the cylindrical container 10 and the second face 31 of the off-centered wall 18. The second compartment 26 is primarily used to house the electronic or electrical components 24 necessary to convert the renewable energy generated by the energy-generating component into electricity to be stored in the adjacently housed batteries 20, or to process such electrical energy. A non-limiting list of such electrical components 24 includes AC/DC converters and invertors, transformers, charge controllers, fuse disconnects, and electrical plug outlets.

In an alternative embodiment, the electrical components 24 can be housed in one or more insertable containers (not shown) designed to fit and stack inside the second compartment 26. The shape of each insertable container is limited only by the contour of the inside of the second compartment 26. The size of the insertable container is sufficient to allow the container to slide into the interior of the second compartment 26 without interference with the walls of the second compartment.

Connecting wires or cables 66 are used to connect the batteries 20 to the electrical components 24. The connecting wires 66 are preferably fitted through an aperture (not shown) in the off-centered wall 18 of the container.

Preferably, both the first and second compartments 22 and 26 of the container 10 are vented to the outside of the container in two separate places. For each compartment, a first vent 5 is located near the top open end of the container, yet far enough below it to avoid interacting with the cover 70 when it is latched to the container. A second vent 6 is located near the bottom closed end 14 of the container 10, yet far enough above the bottom to prevent extraneous water from entering the container. The vents 5 and 6 are preferably slanted out and downward, and are designed to prevent water from entering the enclosed container from the outside environment.

An electrical outlet 85 permits electrical connection of an appliance or electrical powered device to the batteries 20 or directly to the electrical components 24. The electrical outlet 85 is mounted on the outside of the vertical wall 28 of the container 10 and is electrically connected to the batteries and/or to the electrical components within the container.

Figure 8:
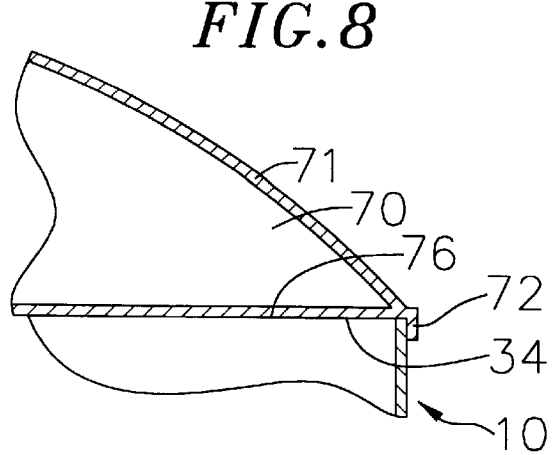
FIG. 8 is a side view of the placement of the cover on the cylindrical container.

The domed-shaped cover 70 is designed to fit over the top edge 34 of the container 10 in a waterproof manner. As shown in FIG. 8, the cover 70 comprises a round top 71 and an annular extension 72 attached to or integral with the rounded top. The inner edge of the annular extension 72 has a diameter sufficient to fit around the top edge 34 of the container 10. The annular extension 72 fits around the top edge 34 of the container 10 in a manner that allows the actual lower edge 76 portion of the domed cover 70 to rest on the upper edge 34 of the cylindrical container 10. Preferably, an elastomeric seal (not shown) is included within the dome-shaped cover 70 and sealably interfaces with both the lower edge 76 portion of the domed top and the upper edge 34 of the cylindrical container 10 in a manner that prevents the two edge surfaces from actually contacting one another while at the same time providing a sufficient seal to prevent water from entering the interior of the container. The elastomeric seal thus creates a waterproof interconnection between the cover 70 and container 10 of the present invention. The elastomeric seal can be permanently attached to the dome-shaped cover, or to the upper edge of the container, or maintained as a separate part of the enclosure system. In an alternative embodiment of the present invention, there is no elastomeric seal, thereby allowing the lower edge portion 76 of the domed cover 70 and the upper edge 34 of the cylindrical container 10 to directly contact one another.

The dome-shaped cover 70 is releasably attached to the cylindrical container 10 by one or more attachment means. A preferred attachment means is a set of three latches 79, as shown in FIG. 4. Each latch 79 is preferably connected to the outside of the cylindrical container 10 and interacts with an interlocking counterpart 78 on outer edge of the annular extension 72 of the cover 70. Any other attachment means can be used as long as it provides a tight fit between the container 10 and cover 70 when engaged, as described below. The interlocking counterparts 78 mounted to the cover 70 are spaced identically to the latches 79 on the container 10 such that the latches 79 and the interlocking counterparts 78 align themselves when the cover 70 is in its proper position. When the latches 79 are engaged with the interlocking counterparts 78, the cover 70 is pulled toward the container 10, causing the elastomeric seal to compress and form a water tight seal. In an alternative embodiment of the present invention that does not include an elastomeric seal, the latches 79 secure the dome-shaped cover 70 to the container 10 without applying a force that pulls down the cover onto the top edge of the container.

In one embodiment, the renewable energy system enclosure 12 includes a pole 80 extending vertically through and above the center of the dome-shaped cover 70. The pole 80 fits through an aperture 82 in the dome-shaped cover 70 and into the cylindrical container 10, and provides adequate support for an energy-generating source 81 mounted thereon, as shown in FIGS. 1, 2 and 3. The edge of the aperture 82 sealably interacts with the pole 80 to provide a water-tight seal. Preferably, this interaction is aided by an elastomeric seal or gasket (not shown) sufficient to provide a water tight seal between the cover 70 and the pole 80.

To accommodate the pole 80 within the container 10, the straight vertical wall 52 of each tray 46 contains a generally semicircular notch 86 of sufficient size to allow the pole 80 to fit therethrough, as shown in FIG. 5. The pole 80 can mount directly against the off-centered wall 18, which is offset from the center of the container 10 so that the pole 80 stands flat against the wall 18 and is in the geometric center of the container. The pole 80 can be set at any height depending on the type of component to be mounted to the enclosure (e.g., one or more photovoltaic panels, a wind generator, or other energy generator). Therefore, the pole 80, the notches 86 of the trays 46, and the aperture 82 in the dome-shaped cover 70 are all aligned along the longitudinal axis of the cylindrical container 10. With this design, the pole 80 is allowed to extend up from the bottom of the container 10 and through the domed-shaped cover 70 to extend above the enclosure a sufficient distance to allow one or more renewable energy source generators 81 to be attached. The pole 80 can be made out of any type of material, provided it is of sufficient strength to support the mounted renewable energy generator 81.

An electrical connector provides contact between the electrical components 24 housed in the interior of the container 10 and the energy-generating component 81 located outside of the container. To protect the electrical connector, an electrical conduit 87 extends from an aperture in the pole 80, but can also extend from an aperture in the dome-shaped cover 70. The aperture and the electrical conduit 87 interact in a sealable and water-tight manner. The electrical connector extends through the electrical conduit 87. In an alternative embodiment of the invention, the electrical conduit 87 extends within the container 10 to protect the electrical connector within the container.

Although the renewable energy system enclosure preferably comprises a cylindrical container and a dome-shaped cover, its shape may be any geometric figure sufficient to house the batteries in one compartment and the electrical components in a separate compartment. A cylinder and dome configuration provides a stable structure and a desirable volume-to-surface area ratio of the enclosure.

I claim:

1. A portable enclosure for housing a renewable energy system and for use with an energy-generating component, the enclosure comprising:

a container having side walls, a bottom wall, an open top, and a dividing wall that divides the inside of the container into first and second compartments, both of which are accessible from the open top, wherein the first compartment is capable of housing at least one 12v battery and wherein the second compartment is capable of housing at least one electrical component other than a battery;

an aperture in the dividing wall capable of permitting a wire or other electrical connection means to extend therethrough to connect the at least one battery to the at least one electrical component;

a lid capable of fitting over and enclosing the open top of the container to provide a water-tight seal therewith;

one or more electrical connectors capable of electrically linking said at least one electrical component other than a battery to a renewable energy generator outside the container; and an externally mounted electrical outlet capable of being electrically connected to a battery or to an electrical component within the container.

2. A portable renewable energy system comprising:

a portable enclosure comprising:

a container having side walls, a bottom wall, an open top, and a dividing wall that divides the inside of the container into first and second compartments, both of which are accessible from the open top, the dividing wall containing an aperture therethrough;

at least one battery housed within the first compartment;

at least one electrical component other than a battery housed within the second compartment;

a wire or other electrical connection means electrically connecting at least one battery to at least one electrical component, the wire or other electrical connection means extending through the aperture in the dividing wall;

a lid capable of fitting over and enclosing the open top of the container to provide a water-tight seal therewith; and an energy-generating source mounted on the enclosure outside of the enclosure and electrically connected to at least one electrical component within the container.

3. A portable enclosure for housing a renewable energy system and for use with an energy-generating component, the enclosure comprising:

a cylindrical container having side walls, a bottom wall, an open top, and a dividing wall that divides the inside of the container into first and second compartments, both of which are accessible from the open top, wherein the first compartment is capable of housing at least one 12v battery and wherein the second compartment is capable of housing at least one electrical component other than a battery;

an aperture in the dividing wall capable of permitting a wire or other electrical connection means to extend therethrough to connect the at least one battery to the at least one electrical component;

a dome-shaped lid capable of fitting over and enclosing the open top of the container to provide a water-tight seal therewith; and one or more electrical connectors capable of electrically linking said at least one electrical component other than a battery to a renewable energy generator outside the container.

4. An enclosure according to claim 3, wherein the dividing wall has a dome-shaped top edge conforming to the inside of the dome-shaped lid.

5. An enclosure according to claim 4, wherein the dividing wall has an elastomeric seal member attached to its top edge.

6. An enclosure according to claim 3, wherein the dividing wall has an elastomeric seal member attached to its bottom, top and side edges.

7. An enclosure according to claim 3, further comprising two pairs of ribs, each pair of ribs protruding from opposite sides of the inside surface of the vertical wall of the container, wherein a space is provided between the ribs of each pair sufficient to secure the divider wall within the container.

8. An enclosure according to claim 3, wherein each compartment is vented to the outside of the container such that air can enter and exit the container, but rainwater is prevented from entering the container.

9. An enclosure according to claim 3, further comprising at least one removable tray shaped to fit within the first compartment and to hold at least one 12V battery.

10. An enclosure according to claim 3, further comprising an externally mounted electrical outlet capable of being electrically connected to a battery or to an electrical component within the container.

11. A portable renewable energy system comprising:

a portable enclosure comprising:

a container having side walls, a bottom wall, an open top, and a dividing wall that divides the inside of the container into first and second compartments, both of which are accessible from the open top, the dividing wall containing an aperture therethrough;

at least one battery housed within the first compartment;

at least one electrical component other than a battery housed within the second compartment;

a wire or other electrical connection means electrically connecting at least one battery to at least one electrical component, the wire or other electrical connection means extending through the aperture in the dividing wall;

a lid capable of fitting over and enclosing the open top of the container to provide a water-tight seal therewith; and an energy-generating source comprising at least one solar panel outside of the enclosure electrically connected to at least one electrical component within the container.

12. A system according to claim 11, wherein the energy-generating source is mounted on the enclosure.

13. A system according to claim 11, wherein the enclosure further comprises at least one removable tray within the first compartment, said tray being capable of holding at least one 12V battery.

14. A system according to claim 11, wherein the enclosure further comprises at least two removable, stackable trays within the first compartment, in the first compartment, each tray being capable of holding at least one 12V battery.

15. A system according to claim 11, wherein the container is cylindrical and the lid is dome-shaped.

16. A portable enclosure for housing a renewable energy system and for use with an energy-generating component, the enclosure comprising:

a container having side walls, a bottom wall, an open top, and a dividing wall that divides the inside of the container into first and second compartments, both of which are accessible from the open top, wherein the first compartment is capable of housing at least one 12v battery and wherein the second compartment is capable of housing at least one electrical component other than a battery;

an aperture in the dividing wall capable of permitting a wire or other electrical connection means to extend therethrough to connect the at least one battery to the at least one electrical component;

a lid capable of fitting over and enclosing the open top of the container to provide a water-tight seal therewith; and one or more electrical connectors capable of electrically linking said at least one electrical component other than a battery to a renewable energy generator outside the container; and at least one removable tray shaped to fit within the first compartment and to hold at least one 12V battery.

17. An enclosure according to claim 16, wherein the tray is capable of holding four 12V batteries.

18. An enclosure according to claim 16, wherein the tray further comprises a sheet of wire mesh that allows air to circulate beneath any batteries within the tray.

19. An enclosure according to claim 16, further comprising at least two removable, stackable trays in the first compartment, each tray being capable of holding at least one 12V battery.

20. An enclosure according to claim 16, wherein the container has a cylindrical shape and the tray has a generally semicircular shape, a closed bottom, an open top, a straight vertical wall, and a rounded vertical wall.

21. An enclosure according to claim 20, wherein each tray further comprises at least one strap having two ends, wherein each end of the strap is attached to the closed bottom of the tray and is sufficiently long to extend over and secure a battery within the tray.

22. An enclosure according to claim 20, wherein the tray further comprises a handle having two ends, wherein the height of the handle is approximately the same as the heights of the straight and rounded vertical walls.

23. An enclosure according to claim 20, wherein the tray contains a notch near the center of the straight vertical wall such that, when the tray is properly installed within the container, the notch is aligned with the axis of the cylindrical container.

24. A method for portably storing energy comprising:

providing a container having side walls, a bottom wall, an open top, and a dividing wall that divides the inside of the container into first and second compartments, both of which are accessible from the open top, the dividing wall containing an aperture therethrough;

housing a battery within the first compartment;

housing at least one electrical component other than a battery within the second compartment;

connecting the battery to the at least one electrical component through the aperture in the dividing wall;

sealing the container with a water-tight sealing lid;

providing an energy-penetrating source mounted on the container outside of the container and electrically connected to the at least one electrical component within the container;

generating energy in energy-generating source; and storing the generated energy in the battery.

* * * * *

UNITED STATES PATENT AND TRADEMARK OFFICE
CERTIFICATE OF CORRECTION

PATENT NO. : 6,106,970  
DATED : August 22, 2000  
INVENTOR(S) : Kerry T. Kalarney Page 1 of 1

It is certified that error appears in the above-identified patent and that said Letters Patent is hereby corrected as shown below:

Column 10,
Line 5, replace "an energy-penetrating source" with -- an energy-generating source --
Line 9, replace "energy in energy-generating" with -- energy in the energy-generating --

Signed and Sealed this

Fifth Day of March, 2002

Attest:

Attesting Officer

JAMES E. ROGAN
*Director of the United States Patent and Trademark Office*